United States Patent [19]

Rivera et al.

[11] Patent Number: 5,722,834
[45] Date of Patent: Mar. 3, 1998

[54] METHOD OF PLAYING A LEARNING TREE BOARD GAME

[76] Inventors: Juan Jose Rivera; Carmen Rivera, both of Apartado 9, Quebradillas, Puerto Rico, 00678-0009

[21] Appl. No.: 500,471

[22] Filed: Jul. 10, 1995

[51] Int. Cl.⁶ .............................. G09B 19/22; A63F 3/00
[52] U.S. Cl. .................... 434/128; 434/159; 434/188; 273/236
[58] Field of Search .................... 434/159, 188, 434/128, 258; 273/243, 249, 269, 271, 273

[56] References Cited

U.S. PATENT DOCUMENTS

| | | |
|---|---|---|
| D. 124,373 | 12/1940 | Simpkins . |
| 1,617,250 | 2/1927 | Haughton . |
| 2,774,598 | 12/1956 | Strocco . |
| 3,656,751 | 4/1972 | Glass et al. |
| 4,341,389 | 7/1982 | Dumont . |
| 4,986,757 | 1/1991 | Mueller . |
| 4,993,717 | 2/1991 | Fiske . |
| 5,249,807 | 10/1993 | Peterson . |
| 5,507,495 | 4/1996 | Kiss ............................. 434/159 X |

FOREIGN PATENT DOCUMENTS 2 209 476   5/1989   United Kingdom .

*Primary Examiner*—Jeffrey A. Smith
*Attorney, Agent, or Firm*—Michael I. Kroll

[57] ABSTRACT

A learning tree board game is provided which includes a game board having a picture of a tree, a sand box area on a lower left hand corner, a green area on a lower right hand corner and a plurality of identifiable indicia upon the picture of a tree. A plurality of playing tokens are provided, in which one for each of the game players is placed on the sand box area at the beginning of the game and then on one of the identifiable indicia during the play of the game. A deck of cards are used, in which each card has indicia thereon which matches up with one of the identifiable indicia upon the picture of a tree of the game board. The deck of cards is placed on the green area face down at the beginning of the game and then one card is picked by each player taking a turn during the play of the game.

1 Claim, 2 Drawing Sheets

(TOKEN)

(TOKEN)

(TOKEN)

(TOKEN)

(23 PICTORIAL CARDS)

METHOD OF PLAYING A LEARNING TREE BOARD GAME

BACKGROUND OF THE INVENTION

1. Field of the Invention

The instant invention relates generally to games and more specifically it relates to a learning tree board game.

2. Description of the Prior Art

Numerous games have been provided in prior art that are adapted to include learning instructions, such as questions and answers on various subject matters, thereby teaching children playing the game. While these units may be suitable for the particular purpose to which they address, they would not be as suitable for the purposes of the present invention as heretofore described.

SUMMARY OF THE INVENTION

A primary object of the present invention is to provide a learning tree board game that will overcome the shortcomings of the prior art devices.

Another object is to provide a learning tree board game which is educational in that it will help children from the ages of three through six to develop motor skills and aid in the identification of shapes, vowels, numbers and colors.

An additional object is to provide a learning tree board game that will also help children that have learning impairments to identify the various items illustrated on the game board.

A further object is to provide a learning tree board game that is simple and easy to use.

A still further object is to provide a learning tree board game that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
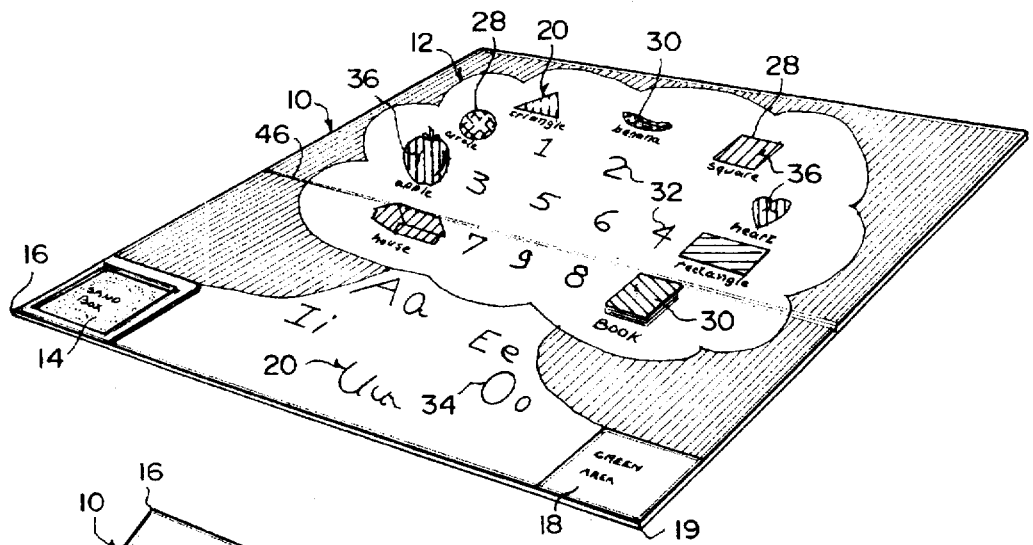
FIG. 1 is a perspective view of the game board in an opened position.

Turning now descriptively to the drawings, in which similar reference characters denote similar elements throughout the several views, FIGS. 1 through 8 illustrates various elements of a learning tree board game. A game board 10, has best seen in FIG. 1, has a picture of a tree 12. A sand box area 14 is on a lower left hand corner 16. A green area 18 is on a lower right hand corner 19. A plurality of identifiable indicia 20 is upon the picture of a tree 12 on the game board 10.

A plurality of playing tokens 22 are shown in FIGS. 3 through 7, in which one is for each of the game players and is placed on the sand box area 14 at the beginning of the game and then on one of the identifiable indicia 20 during the play of the game.

Figure 3:
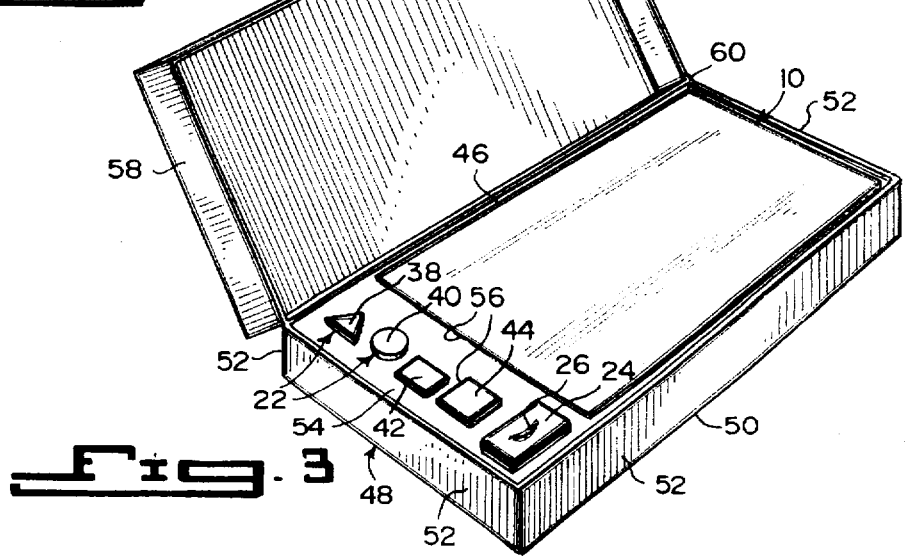
FIG. 3 is a perspective view of a game box with its cover opened, showing the various components of the game stored therein.
Figure 4:
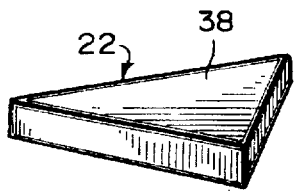
FIG. 4 is a perspective view of the triangular shaped playing token.
Figure 5:
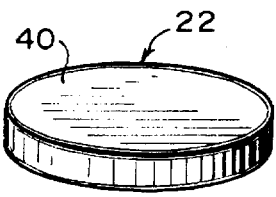
FIG. 5 is a perspective view of the circular shaped playing token.
Figure 6:
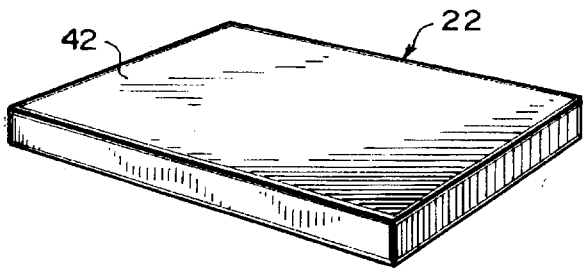
FIG. 6 is a perspective view of the rectangular shaped playing token.
Figure 7:
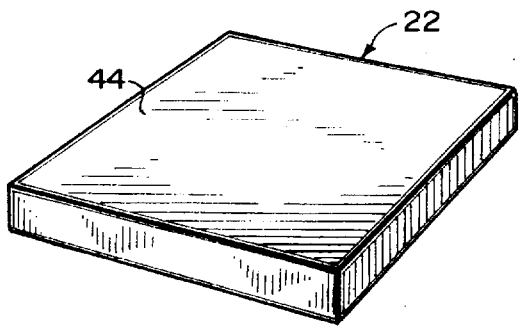
FIG. 7 is a perspective view of the square shaped playing token.
Figure 8:
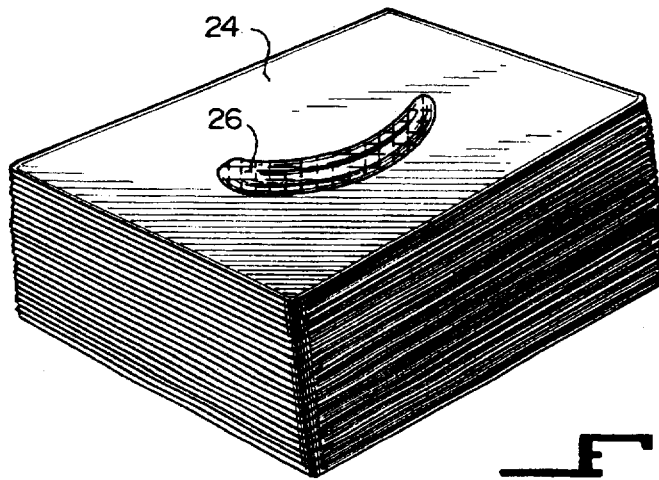
FIG. 8 is a perspective view of the deck of pictorial cards.

A deck of cards 24 is shown in FIGS. 3 and 8, in which each card 24 having indicia 26 thereon, matches up with one of the identifiable indicia 20 upon the picture of a tree 12 on the game board 10. The deck of cards 24 is placed on the green area 18 face down at the beginning of the game and then one card 24 is picked by each player taking a turn during the play of the game.

The identifiable indicia 20 includes a plurality of different geometric shapes 28, a plurality of different illustrations 30, a plurality of different numbers 32 and a plurality of different upper and lower case letter vowels 34. The geometric shapes 28 and the illustrations 30 are in a plurality of different colors 36. The playing tokens 22 are each triangular shaped as indicated by numeral 38 in FIG. 4, circular shaped as indicated by numeral 40 in FIG. 5, rectangular shaped as indicated by numeral 42 in FIG. 6 and square shaped as indicated by numeral 44 in FIG. 7. The indicia 26 on the cards 24 includes geometric shapes, illustrations, numbers and upper and lower case letter vowels that are on the game board 12.

Figure 2:
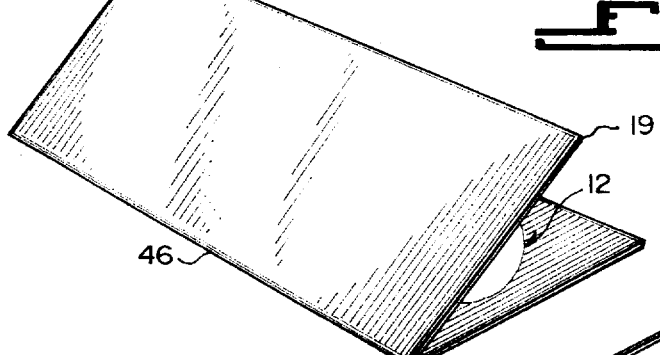
FIG. 2 is a perspective view of the game board being folded into a closed position.

The game board 10 is square shaped and includes a central fold line 46 thereacross, so that the game board 10 can be folded along the fold line 46, as shown in FIG. 2, into a rectangular shaped closed position for storage.

A game box 48, shown in FIG. 3, is for storing the folded game board 10, the playing tokens 22 and the deck of cards 24. The game box 48 includes a generally rectangular shaped base 50. Four side walls 52 extend upwardly from the base 50. A top wall 54 is raised above the base 50 and has a plurality of storage compartments 56, to receive the folded game board 10, the playing tokens 22 and the deck of cards 24. A cover 58 is hinged at 60 to a top edge of one side wall 52, to be positioned over the game box 48.

RULES OF THE GAME

Purpose: To help a child develop motor skills and aid in identification of shapes, numbers, vowels and colors.

Object of the Game: To be the first one to identify five objects on the game board.

Ages: three to six years old.

Contents: One game board, four playing tokens, twenty three pictorial cards in a deck.

Players: One, two, three or four.

Game Set Up:

1. Unfold the game board and place it flat on the table.
2. Place the cards face down on the lower right side of the game board called "Green Area".
3. Each player will place their token on the lower left side of the game board called the "Sand Box".
4. Before the game is started, players should select game one or two.

How To Play The Game: There are two ways to play the game:

Game One:
a. Each player draws a card from the deck, the player with the highest number will go first, the second highest goes second, etc.
b. The first player draws a card from the deck and moves his playing token accordingly.
c. If a player matches the indicia on the card with the indicia on the game board he keeps the card, if not, the card must be returned to the bottom of the deck.

Game Two (Categories):
a. Each player will try to collect three cards of the three different categories. Example: three vowels, three numbers, three shapes.
b. No player can collect more than one category at a time or withhold the other players cards.

How To Win Game One:
The first player to match and collect five cards will win the game.

How To Win Game Two (Categories):
If you are playing game two, the first player to collect three cards of the three different categories wins the game.

LIST OF REFERENCE NUMBERS 10 game board
12 picture of a tree
14 sand box area
16 lower left hand corner of 10
18 green area
19 lower right hand corner of 10
20 identifiable indicia upon 12
22 playing token
24 card
26 indicia on 24
28 geometric shape for 20
30 illustration for 20
32 number for 20
34 upper and lower case letter vowel for 20
36 color
38 triangular shaped for 22
40 circular shaped for 22
42 rectangular shaped for 22
44 square shaped for 22
46 fold line on 10
48 game box
50 rectangular shaped base of 48
52 side wall of 48
54 top wall of 48
56 storage compartment in 54
58 cover of 48
60 hinge on 52

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of playing a board game for children in the age group of three to six whereby players compete in matching indicia on cards with indicia on a game board in order to develop motor skills and aid in an identification of shapes, numbers, vowels and colors, said method comprising the steps of:

a) preparing a game board containing indicia located in the outline of a tree formed on said game board, said indicia including a plurality of different geometric shapes, a plurality of different illustrations of objects including a book, a house and an apple, a plurality of different numbers, and a plurality of different upper and lower case letter vowels arranged throughout said tree;

(b) each player in turn selecting an indicia on said game board from a deck of cards, each of said cards containing an indicia matching an indicia on said game board, said deck of cards being placed face down in a designated area on said board at commencement of play; and (c) each player identifying on said board an indicia identical to the indicia selected from said deck of cards using a plurality of playing tokens, one for each player, said tokens being all placed in a designated area on said board at the commencement of play, the token of the player selecting a card from said deck being moved by said player to the matching indicia on said board and the player retaining a card for each match being made, the player first identifying a predetermined number and type of indicia on the board as represented by cards accumulated winning the game.

* * * * *